United States Patent [19] [11] Patent Number: 4,743,792
Ueyama [45] Date of Patent: May 10, 1988

[54] PIEZOELECTRIC MOTOR
[75] Inventor: Tsutomu Ueyama, Yawata, Japan
[73] Assignee: Dainippon Screen Mfg. Co., Ltd., Kyoto, Japan
[21] Appl. No.: 946,917
[22] Filed: Dec. 22, 1986
[30] Foreign Application Priority Data
Dec. 23, 1985 [JP] Japan .................. 60-290087
[51] Int. Cl.⁴ .......................................... H01L 41/08
[52] U.S. Cl. ...................................... 310/328; 310/317
[58] Field of Search ...................... 310/323, 328, 317
[56] References Cited
U.S. PATENT DOCUMENTS
4,455,501 6/1984 Tojo et al. ........................... 310/328
4,562,374 12/1985 Sashida .......................... 310/323 X
4,620,121 10/1986 Mishiro ........................... 310/328 X
4,642,509 2/1987 Kumada ............................ 310/323

FOREIGN PATENT DOCUMENTS
3500607 7/1985 Fed. Rep. of Germany ...... 310/328
0138469 10/1981 Japan ................................... 310/328
0229680 11/1985 Japan ................................... 310/328
0612357 6/1978 U.S.S.R. ............................. 310/323

Primary Examiner—Mark O. Budd
Attorney, Agent, or Firm—Lowe, Price, LeBlanc, Becker & Shur

[57] ABSTRACT

A piezoelectric motor constructed so as to convert deformation movements of a plurality of electrostrictive elements to a rotatory movement and then to output it through an output shaft as rotary power at a low speed. The piezoelectric motor includes a plurality of electrostrictive elements, a disk-shaped precessional movement plate supported to be driven by the deformations of these electrostrictive elements and to perform a precessional movement without rotation on its axis, a rotary plate arranged to be driven at a reduced speed by a circumferential difference between circular paths described by contact under pressure, at a precessional angle $\theta$ with a peripheral portion of the precessional movement plate. An output shaft is operatively connected to the rotary plate to deliver output power.

11 Claims, 2 Drawing Sheets

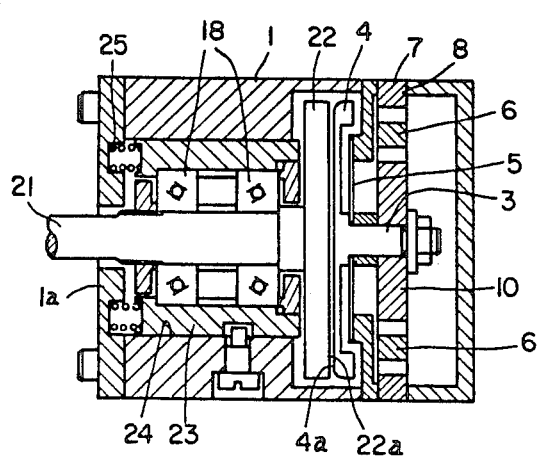
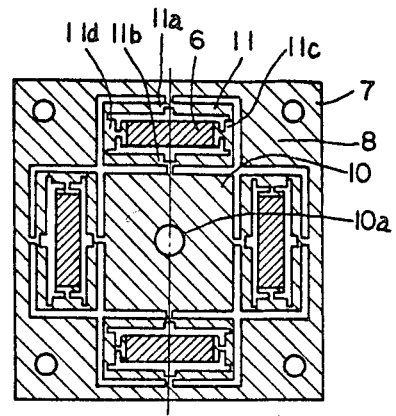
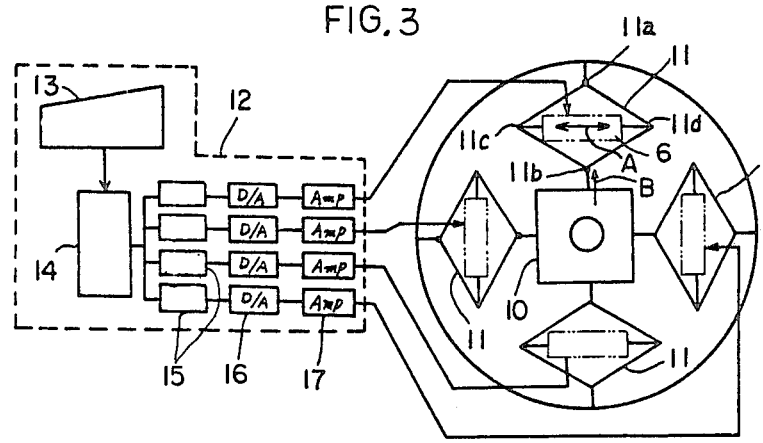
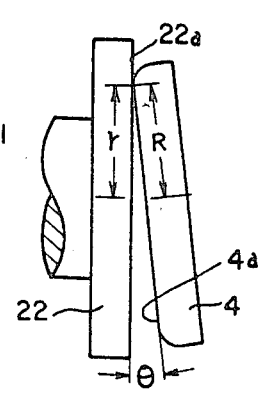
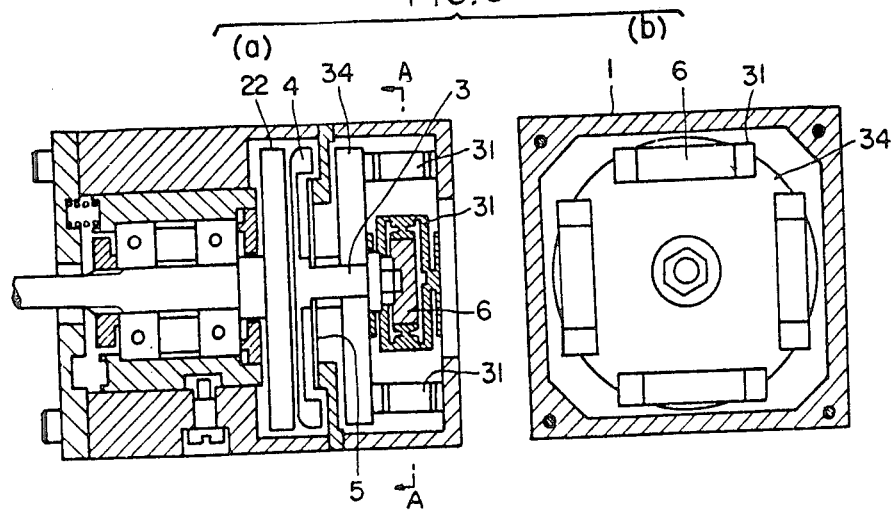

$E_a = A \sin wt$
$E_b = A \cos wt$
$E_c = A \sin(wt + \pi)$
$E_d = A \cos(wt + \pi)$

PIEZOELECTRIC MOTOR

BACKGROUND OF THE INVENTION

1. Field of the Invention

The present invention relates to a piezoelectric motor constructed as to utilize a variation of the strain of a piezoelectric element and an electrostrictive element to provide a rotary output at a shaft thereof, wherein, for example, the piezoelectric element is composed of plumbum zirconate titanate (PZT) and the electrostrictive element is composed of plumbum magnesium-niobate (PMN).

2. Prior Art

Piezoelectric motors, for example a motor, as shown in FIG. 8 hereof and as disclosed in Japanese Provisional Patent Publication No. 60 (1985)-160384, are known in the art.

Around a rotor 52 of such a piezoelectric motor there are provided plural electrostrictive elements 53a to 53d of which the strain directions are directed toward the center of a rotary shaft 55 of the motor. These electrostrictive elements 53a 53d are supplied to respectively different phase voltages Ea to Ed, as shown in FIG. 5, and the rotor 52 is driven in a circular motion without rotating on its axis by the strains of the respective electrostrictive elements 53a to 53d. The rotary shaft 55 engages loosely with a circular hole 54 formed in the central portion of the rotor 52 and is supported rotatably by a motor case 51. Thus the rotary shaft 55 is driven rotatively with its exterior surface kept in contact with the surrounding interior surface of the circular hole 54, by the circular motion of the rotor 52.

In this case, a clearance $\Delta$ between the radius R of the circular hole 54 of the rotor 52 and the radius r of the rotor shaft 55 is equal to $2(R-r)$. Since the rotor 52 is adapted not to rotate on its axis and further the contacting surfaces of both the circular hole 54 and the rotary shaft 55 are adapted to slipping, the rotary shaft 55 is rotated at a speed reduction ratio corresponding to $2\pi(R-r)/2\pi r=(R-r)/r$ from the circumferential difference $2\pi(R-r)$ between the interior circumferential $2\pi R$ of the circular hole 54 and the exterior circumferential $2\pi r$ of the rotary shaft 55. Therefore, the speed reduction ratio per one circular motion of the rotor 52 becomes $\Delta/2r$, and this is in proportion to the clearance $\Delta$.

This type of piezoelectric motor is simple in construction, can be small-sized and is able to attain a low rotational speed without requiring any reduction gears. Furthermore, since it has no magnetic coil, such as that used in a general motor, it is useful as a driving source of a driving apparatus that should not be affected by a magnetic field.

However, in the above-mentioned prior art piezoelectric motor, since the rotary shaft 55 engages loosely with the circular hole 54 of the rotor 52, a certain amount of clearance $\Delta$ is required therebetween in order that the rotary shaft rotates with its exterior surface kept in contact to the surrounding interior surface of the circular hole 54. For example, in the case of the radius of the rotary shaft being 10 mm, since at least 40 $\mu$m is necessary for the clearance $\Delta$, a speed reduction ratio of approximately 1/500 (i.e., 40 $\mu$m/2×10 mm) is attained.

Accordingly, when a smaller speed reduction ratio (for example, of the order of 1/10000) is required, the clearance $\Delta$ must be made correspondingly smaller sufficiently than 40 $\mu$m. But it is almost impossible to make the circular hole 54 of the rotor 52 and the rotary shaft 55 to satisfy such a condition. Hence, a very small speed reduction ratio can not be attained without further enlarging both the circular hole 54 and the rotary shaft 55. Even if such enlargements thereof were possible, it is would be either difficult or even impossible for an electrostrictive element having such a strain variation as 10 $\mu$m to drive such an enlarged arrangement.

Furthermore, since both the radius R of the circular hole 54 and the radius r of the rotary shaft 55 can not be changed at will in the abovementioned prior art piezoelectric motor, the speed reduction ratio thereof has a fixed value, that cannot be changed as occasion demands.

DISCLOSURE OF THE INVENTION

The present invention is directed to solving the problems noted above, and has for its first object to provide a piezoelectric motor which can attain a speed reduction ratio, for example, of the order of 1/10000, much smaller than that of known motors.

Another object of this invention is to provide a piezoelectric motor which allows changes to be made in the speed reduction ratio thereof as occasion demands.

In order to accomplish the aforementioned objects, according to the invention, there is provided a piezoelectric motor with driving means that include a plurality of electrostrictive elements; a disk-shaped precessional movement plate member connected to said electrostrictive members and supported in a manner to perform a precessional movement without rotation on its own axis by means of the electrostrictive elements; a rotary plate member driven rotationally at a reduced speed by a circumferential difference between circular paths described by its contacting, under pressure, at a precessional angle with a peripheral portion of the precessional movement plate member during precessional movement thereof; and an output shaft operatively connected to the rotary plate member, wherein deformations of the electrostrictive elements causes the precessional movement plate member to perform precessional movement which causes the rotary plate member to rotate at a reduced speed.

In a preferred embodiment, the precessional movement plate member is provided with a support-shaft on its axis which has a support point supported by a holding means and portions thereof remote from the support point are connected to the electrostrictive elements respectively through a support-shaft connecting means to enable the precessional movement of the processional movement plate member through the support-shaft by the deformations of the electrostrictive elements.

In another preferred embodiment, the electrostrictive elements are connected to peripheral portions of the precessional movement plate member through a supplementary plate.

Preferably, the electrostrictive elements drive the precessional movement plate member through a strain variation magnifying means.

Still preferably, the electrostrictive elements are provided with a voltage applying means for applying a waveform correction voltage thereto so as to drive the precessional movement plate member at a uniform speed.

The foregoing and other objects and attendant advantages of the present invention will be readily appreciated as the same becomes better understood by reference to the following detailed description when considered by the accompanying drawings.

BRIEF DESCRIPTION OF THE DRAWINGS

FIG. 1 is a longitudinal view showing a principal part of a first embodiment of the present invention;

FIG. 2 is a plan view showing a support-shaft driving plate;

FIG. 3 is a schematic plan view showing a piezoelectric motor;

FIG. 4 is an explanatory view showing an operational state of the precessional movement;

FIG. 6(a) is a sectional view showing a principal part of a second embodiment;

FIG. 6(b) is a section taken along the line A—A of FIG. 6(a);

DESCRIPTION OF THE PREFERRED EMBODIMENT

Figure 7:
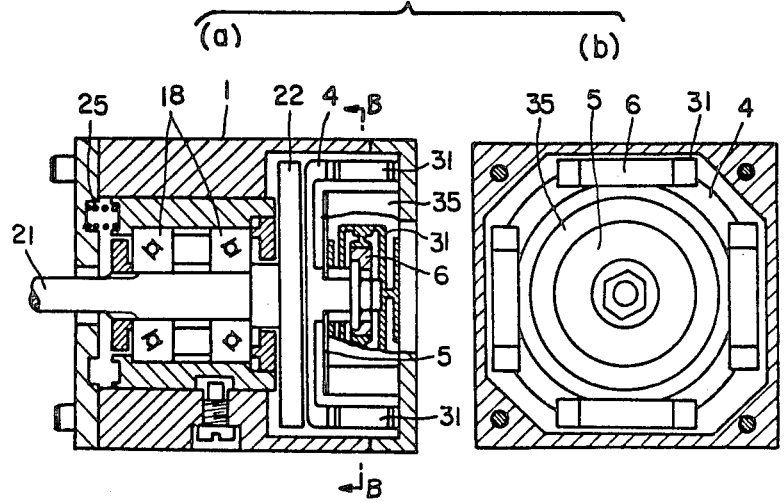
FIG. 7(a) is a sectional view showing a principal part of a third embodiment.
FIG. 7(b) is a section taken along the line B—B of FIG. 7(b)

When waveform voltages with phase differences to each other are applied to the electrostrictive elements respectively by a control circuit, the electrostrictive elements deform respectively in accordance with the phase differences applied to. These deformations of the electrostrictive elements are transferred to the precessional movement plate through a strain variation magnifying means and the like.

The precessional movement plate is formed in the shape of a disk and is so supported as not to rotate on its axis but to perform a precessional movement through its central support-shaft. Therefore, the precessional movement plate will perform the precessional movement at a precessional angle $\theta$ by the deformations of the electrostrictive elements.

The rotary plate is rotatably supported face to face with the precessional movement plate. When performing its precessional movement, the facing surface of the precessional movement plate will be inclined at a precessional angle $\theta$ with the rotary plate and the peripheral portion of the former will contact under pressure with the facing surface of the rotary plate. (see FIG. 4) Thereupon, the path swept out by the contact point therebetween is described as a circle by the precessional movement. The rotary plate rotates owing to the circumferential difference $2\pi(R-r)$ between the circumference $2\pi R$ of the peripheral portion of the precessional movement plate (where R is the radius of the peripheral portion) and the circumference of the circular path $2\pi r$ (where r is the radius of the circular path). The rotary angle j (radian) of the rotary plate per one turn of the precessional movement of the precessional movement plate and the speed reduction ratio i thereby are attained respectively as follows.

$$j = 2\pi(R-r)/r \text{ (rad.)}$$

$$\begin{aligned} i &= 2\pi(R-r)/2\pi r \\ &= (1 - \cos\theta)\cos\theta \end{aligned}$$

(where $r = R\cos\theta$)

The output shaft is operatively connected to the rotary plate and the rotary power greatly decelerated, i.e., at a much slower rotational speed, is transmitted thereto.

Accordingly, since the piezoelectric motor of the present invention is adapted to effect the precessional movement of the precessional movement plate by means of the electrostrictive elements as described above and to drive the rotary plate rotationally with its facing surface maintained in contact with the peripheral portion of the precessional movement plate, it has the following advantages;

(a) Since the speed reduction ratio i is set by the precessional angle $\theta$ as described above and the precessional angle $\theta$ can be set to a sufficiently small value by selecting the voltage applied to the electrostrictive elements accordingly in the above-described construction, a much smaller speed reduction ratio can be obtained in comparison with that of the prior art. For example, where the applied voltage is so selected as to make the precessional angle $\theta$ become (5/6) degree, the speed reduction ratio is approximately 1/9000.

(b) Since the precessional angle $\theta$ can be controlled by the voltage applied to the electrostrictive elements, the speed reduction ratio can be changed very easily as occasion demands.

(c) When it is arranged that the strain variation is magnified by the strain variation magnifying means, the variable range of the speed reduction ratio can be further enlarged.

In FIG. 1, which is a sectional view showing a principal part of the piezoelectric motor according to the present invention, reference numeral 1 denotes a motor casing, 4 a precessional movement plate, 6 an electrostrictive element and 22 a rotary plate. The nonrotating precessional movement plate 4 is supported by a diaphragm 5 comprising an elastic plate through its support-shaft 3, the end of which is fixed to a connecting portion 10 of a support-shaft operating plate 7.

As shown in FIG. 2, the support-shaft operating plate 7 comprises a motor casing attaching portion 8 adapted to be fixed to the motor casing 1, the support-shaft connecting portion 10 adapted to be fixed to the support-shaft 3 of the precessional movement plate 4 and four strain variation magnifying portions 11 which are provided with an electrostrictive element 6 respectively and are connected to both the motor casing attaching portion 8 and the support-shaft connecting portion 10, and is formed of an integrated elastic metal plate. The strain variation magnifying portion 11 may be the only portion formed of the elastic metal plate.)

There are provided two pairs of strain variation magnifying portions 11 disposed at equal intervals around a support-shaft connecting hole 10a which is bored at the center of the connecting portion 10 and is also centered among the magnifying portions 11. The strain variation magnifying portions 11 are so formed as to constitute a four-directional magnification link mechanism typical view of which is shown in a part of FIG. 3. The opposite end portions 11a, 11b on the short shaft sides of the link means 11 are connected to the casing attaching portion 8 and to the support-shaft connecting portion 10 respectively, and the opposite portions 11c, 11d on the long shaft sides thereof are connected to the opposed ends of the electrostrictive element 6. Further, the four-directional magnification link portions 11 are adapted to be deformed and restored to their original state at the connecting portions because they are formed of an integrated elastic metal plate, as described above. Accordingly, when the electrostrictive element 6 is controlled by a control circuit, as explained below, and is extended in the direction of arrow A, the support-shaft connecting portion 10 connected thereto is pulled in the direction of arrow B. Thereupon, since the displacement in the direction of arrow B is inversely proportional to the lengths of the long diagonal and the short diagonal of the diamond or trapezoidal shape defined by the locations 11a–11d, the strain variation of the electrostrictive element 6 is magnified.

The electrostrictive element 6 (for example, a stacked piezoelectric actuator element made by Nippon Electricity Co., Ltd.) comprises a piezo-stack which is constructed by stacking and combining many piezoelectric members in its extensional direction. For example, an element of length of 9 mm is extended approximately 7.5 μm by applying voltage a of 150 V, thereby outputting a driving force of approximately 20 kgw.

As best seen with reference to FIG. 3, the control circuit comprises a voltage-setting means 13 for controllably setting a voltage applied to each electrostrictive element 6, a computer 14 for controlling the operation of electrostrictive elements 6 in a predetermined time sequence, four sets of operative waveform correction memories 15 for operating the respective electrostrictive elements independently, a D-A converter circuit 16 and an amplifier circuit 17.

Figure 5:
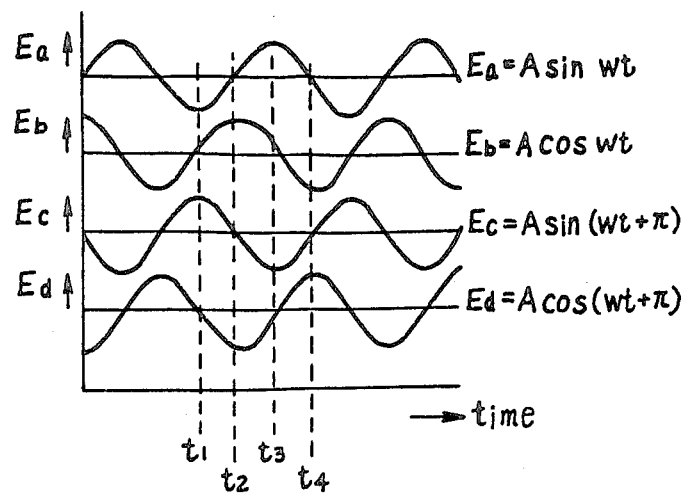
FIG. 5 is an explanatory view showing the operative wave-forms for the electrostrictive elements.

The operative waveform correction means 15 is adapted to store the data of the waveforms composed of a deformed sinusoidal wave in order to correct for hysteresis of the electrostrictive element 6 and an operative linearity attained by the strain variation magnifying portion 11. Accordingly, although the waveforms of the voltages Ea–Ed applied to the respective electrostrictive elements 6 are composed of deformed sinusoidal waves as shown in FIG. 5, the support-shaft connecting portion 10 which is driven through the strain variation magnifying portions 11 performs a smooth circular movement without any deformations.

As illustrated in FIG. 1 the support-shaft 3 is supported in a way such that it can perform a precessional movement because its intermediate portion is fixedly connected to the diaphragm 5 formed of an elastic plate made of material such as a plate spring steel, as described above. Therefore, since the end of the support-shaft 3 at the connecting portion 10 is driven in a circular motion, the support-shaft 3 and the precessional movement plate 4 perform the precessional movement without rotation on their common axis. In this connection, the precessional angle θ can be varied by selectively setting a voltage to be applied through the voltage setting means 13 of the control circuit 12.

The rotary plate 22 is supported face to face with the precessional movement plate 4 by an output shaft 21 the inner of which is fixed to the plate 22 and which is supported rotatably by a bearing 18. When the facing surface 22a thereof is kept in contact with the peripheral portion 4a of the precessional movement plate 4 during the latter's precessional movement, the contact point therebetween rotates describing a circular path during the precessional movement, the rotary plate 22 is driven to rotate at a very slow speed.

The bearing 18, best seen in FIG. 1, comprises an inner bearing race fixed to the exterior of the output shaft 21, the outer race being held in the interior of the bearing holder 23 and the bearing holder 23 being supported slidably axially of the output shaft 21 within the cylinder 24 of the motor casing 1. The bearing holder 23 is biassed toward the precessional movement plate 4 by a compression spring 25 supported by the side cover 1a for the motor casing 1. Therefore, even in cases where the precessional angle θ is increased, the rotary plate 22 can be in contact with the precessional movement plate 4 by a specified contact pressure. In the piezoelectric motor of the above-described embodiment, for example, approximately 1 rpm can be attained as the rotational speed of the output shaft 21 when a voltage of 150 V is applied with a sinusoidal wave whose at a frequency of 200 Hz. The corresponding speed reduction ratio is 1/12000.

The ultradeceleration piezoelectric motor of the type described above can be utilized, for example, as a drive source for a photosensitive surface in a plane-scanning type image recording apparatus.

Figure 8:
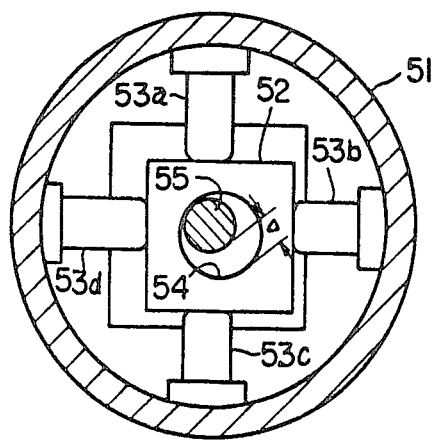
FIG. 8 is a front view showing a conventional piezoelectric motor.

Note that the precessional angle θ of the precessional movement plate 4 can be made larger by shifting the support position of the shaft 3 thereof more closely to the support-shaft operating plate 7. Hence it is not always necessary to provide the four-directional magnification link members 11 as described hereinabove. In that case, the electrostrictive elements 6 are connected to be directed toward the support-shaft connecting hole 10a as illustrated in FIG. 8.

Further, since the support-shaft operating plate 7 is formed of an elastic member so that the electrostrictive elements 6 connected to the support-shaft connecting portion 10 will not be affected by a bending stress and the like as in the present embodiment, the elements 6 composed of a plastic material are rarely broken.

On the other hand, even when an arrangement is made such that the positions of the diaphragm 5 and the support-shaft operating plate 7 are inverted, the precessional movement plate 4 can perform the precessional movement.

In such an arrangement, the center of the precessional movement plate 4 will make a circular motion, although it will frequently make the same motion even in the arrangement where the positions thereof are not inverted.

As occasion demands, the radius r of the contact circular path of the rotary plate 22 may be made larger that that R of the peripheral portion of the precessional movement plate 4. If there is a circumferential difference therebetween even in this case, the rotary plate 22 is driven rotationally in accordance with the circumferential difference although the rotational direction thereof is different.

The second embodiment is best seen in FIG. 6. In FIG. 6, the parts common to those of the first embodiment are indicated by the same symbols as in FIG. 1. FIG. 6(b) is a section taken along the line A—A in FIG. 6(a).

The second embodiment differs from the first one in that the support-shaft 3 of the precessional movement plate 4 is provided with an supplementary plate 34 which, meanwhile, is on its peripheral portions equipped vertically with four strain variation magnifying means 31 while including the electrostrictive elements 6.

When the four electrostrictive elements 6 receive respectively applied operative waveforms as shown in FIG. 5, the supplementary plate 34 performs the precessional movement without rotation about its axis and then the precessional movement plate 4 also performs the precessional movement responsive thereto. Thereupon, the rotary plate 22 rotates responsive to the precessional movement as in the case of the first embodiment in FIG. 1.

FIG. 7 shows a third embodiment similar to the second embodiment. In this embodiment, the precessional movement plate 4 is adapted to perform the precessional movement without the rotation on its axis by means of the strain variation magnifying means 31 alone, and the diaphragm 5 is fixedly supported by a support 35.

While only the preferred embodiments of the present invention have been described above, it should be understood that various modifications may thereof be made without departing from the spirit of the invention and the scope of the appended claims.

I claim:

1. A piezoelectric motor, comprising: means for driving said motor, comprising a plurality of electrostrictive elements; a disk-shaped precessional movement plate member, connected to said electrostrictive members and supported so as to perform a precessional movement without rotation on its axis by coaction with the electrostrictive elements; a rotary plate member, driven rotationally at a reduced speed corresponding to a circumferential difference between circular paths described by contact, under pressure at a selected precessional angle with a peripheral portion of said precessional movement plate member, during precessional movement of the precessional movement plate member; and an output shaft operatively connected to said rotary plate member, whereby deformations of said electrostrictive elements cause the precessional movement plate member to perform said precessional movement which causes the contacting rotary plate member and output shaft to rotate at a reduced speed.

2. The piezoelectric motor as claimed in claim 1, wherein:
the precessional movement plate member is provided with an axial support-shaft, the support-shaft having a support point supported by a holding means, portions of the support-shaft remote from the support point being connected to the electrostrictive elements respectively through support-shaft connecting means to thereby enable generation of the precessional movement of said precessional movement plate member through the support-shaft by deformations of the electrostrictive elements.

3. The piezoelectric motor as claimed in claim 1, further comprising:
a supplementary plate, disposed so that the electrostrictive elements are connected to peripheral portions of the precessional movement plate member through said supplementary plate.

4. The piezoelectric motor as claimed in claim 1, further comprising:
means for magnifying strain variation disposed so that the electrostrictive elements drive the precessional movement plate member through said strain variation magnifying means.

5. The piezoelectric motor as claimed in claim 1, further comprising:
means for applying selected voltages to the electrostrictive elements, whereby the electrostrictive elements are individually provided with respective waveform voltages such that the electrostrictive elements coact to drive the precessional movement plate member at a uniform rotational speed.

6. The piezoelectric motor as claimed in claim 1, wherein:
said contact between said rotary plate member and said precessional movement plate has a geometric locus on the rotary plate member in the form of a first circle of radius "r", and a corresponding geometric locus on the precessional movement plate in the form of a second circle of radius "R", such that corresponding radii through the contact point form therebetween a precessional angle "$\theta$", whereby a speed ratio defined as (rotational speed of the rotary plate member/precessional speed of the precessional plate) equals $(R-r)/r$.

7. The piezoelectric motor as claimed in claim 6, wherein:
$r = R \cos \theta$, whereby, for selected values of r and R, said speed ratio equals $(1 - \cos \theta)/\cos \theta$.

8. The piezoelectric motor as claimed in claim 6, wherein:
r is larger than R and causes said rotary plate member to rotate in a direction opposite to the precessional direction of said precessional movement plate.

9. The piezoelectric motor as claimed in claim 6, wherein:
said speed ratio is less than 1/10,000.

10. The piezoelectric motor as claimed in claim 7, wherein:
said speed ratio is less than 1/10,000.

11. The piezoelectric motor as claimed in claim 8, wherein:
said speed ratio is less than 1/10,000.

* * * * *